(12) United States Patent
Zhao et al.

(10) Patent No.: US 11,803,538 B2
(45) Date of Patent: Oct. 31, 2023

(54) DISTRIBUTED TRANSACTION PROCESSING METHOD AND RELATED APPARATUS

(71) Applicant: Tencent Technology (Shenzhen) Company Limited, Shenzhen (CN)

(72) Inventors: Wei Zhao, Shenzhen (CN); Hao Tang, Shenzhen (CN); Dongzhi Zhao, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 693 days.

(21) Appl. No.: 16/939,815

(22) Filed: Jul. 27, 2020

(65) Prior Publication Data

US 2020/0356549 A1 Nov. 12, 2020

Related U.S. Application Data

(63) Continuation of application No. PCT/CN2019/087179, filed on May 16, 2019.

(30) Foreign Application Priority Data

Jun. 20, 2018 (CN) .......................... 201810636987.4

(51) Int. Cl.
| | |
|---|---|
| *G06F 16/23* | (2019.01) |
| *G06F 12/0875* | (2016.01) |
| *G06F 11/07* | (2006.01) |
| *G06F 11/14* | (2006.01) |

(Continued)

(52) U.S. Cl.
CPC ...... *G06F 16/2379* (2019.01); *G06F 12/0875* (2013.01); *G06F 2212/163* (2013.01)

(58) Field of Classification Search
CPC ............ G06F 16/2379; G06F 12/0875; G06F 2212/163; G06F 11/0757; G06F 11/1474;

(Continued)

(56) References Cited

U.S. PATENT DOCUMENTS

| | | | |
|---|---|---|---|
| 6,052,695 A * | 4/2000 | Abe | .................... G06F 11/1471 |
| 7,421,430 B2 | 9/2008 | Meng | |

(Continued)

FOREIGN PATENT DOCUMENTS

| | | |
|---|---|---|
| CN | 101089857 A | 12/2007 |
| CN | 102368210 A | 3/2012 |

(Continued)

OTHER PUBLICATIONS

International Search Report and Written Opinion for International Patent Application No. PCT/CN2019/087179 dated Aug. 8, 2019; 11 pages.

(Continued)

*Primary Examiner* — Robert W Beausoliel, Jr.
*Assistant Examiner* — Mohammad S Bhuyan
(74) *Attorney, Agent, or Firm* — Crowell & Moring LLP

(57) ABSTRACT

The present disclosure discloses a method, a related apparatus and storage medium for distributed transaction processing. The method includes: obtaining, by a distributed transaction processing device, a distributed transaction processing request; writing, by the distributed transaction processing device, a commit log corresponding to the distributed transaction processing request to a second object database set in the target database cluster, the commit log comprising a commit indication result; obtaining, by the distributed transaction processing device after the distributed transaction processing device resumes distributed transaction processing, the commit log from the second object database set; and performing, by the distributed transaction processing device when the commit indication result in the commit log instructs to commit the processing operation on the account data in the N accounts, the processing operation on the account data in the N accounts. The present disclosure resolves a technical problem that the (Continued)

accuracy of distributed transaction processing cannot be ensured when established steps of a distributed transaction are interrupted.

20 Claims, 8 Drawing Sheets

(51) Int. Cl.
- *G06F 9/46* (2006.01)
- *G06F 11/30* (2006.01)
- *G06F 16/25* (2019.01)
- *G06F 16/18* (2019.01)
- *G06F 16/27* (2019.01)

(58) Field of Classification Search
CPC .. G06F 2201/81; G06F 9/466; G06F 11/1471; G06F 11/3006; G06F 11/302; G06F 16/23; G06F 16/2365; G06F 16/25; G06F 16/1865; G06F 16/27

See application file for complete search history.

(56) References Cited

U.S. PATENT DOCUMENTS

| | | | | |
|---|---|---|---|---|
| 2003/0070080 A1* | 4/2003 | Rosen | .................. | G06Q 20/381 |
| | | | | 713/187 |
| 2004/0162859 A1* | 8/2004 | Guo | ........................ | G06F 16/27 |
| 2005/0228834 A1* | 10/2005 | Shinkai | ................... | G06F 9/466 |
| | | | | 714/E11.131 |
| 2008/0005220 A1* | 1/2008 | Tsunakawa | ............. | G06F 9/466 |
| | | | | 709/201 |
| 2015/0248308 A1* | 9/2015 | Little | ..................... | G06F 9/466 |
| | | | | 707/703 |

FOREIGN PATENT DOCUMENTS

| | | |
|---|---|---|
| CN | 102831156 A | 12/2012 |
| CN | 107797850 A | 3/2018 |
| EP | 0772136 A2 | 5/1997 |
| EP | 1450270 A2 | 8/2004 |
| EP | 2919131 A | 9/2015 |

OTHER PUBLICATIONS

Chinese Office Action for Chinese Patent Application No. 201810636987.4 dated Jul. 14, 2022, 6 pages.

European Search Report for European Patent Application No. 19821902.4 dated Jun. 11, 2021, 13 pages.

European Office Action for European Patent Application No. 19821902.4 dated Apr. 28, 2023, 10 pages.

* cited by examiner

DISTRIBUTED TRANSACTION PROCESSING METHOD AND RELATED APPARATUS

RELATED APPLICATION

This application is a continuation application of the International PCT Application No. PCT/CN2019/087179, filed with the National Intellectual Property Administration, PRC on May 16, 2019 which claims priority to Chinese Patent Application No. 201810636987.4, entitled "DISTRIBUTED TRANSACTION PROCESSING METHOD AND APPARATUS, STORAGE MEDIUM, AND ELECTRONIC APPARATUS" and filed with the National Intellectual Property Administration, PRC on Jun. 20, 2018, which are incorporated herein by reference in their entireties.

FIELD OF THE TECHNOLOGY

The present disclosure relates to the field of computers, and specifically, to a distributed transaction processing technology in a database management system.

BACKGROUND OF THE DISCLOSURE

In a process of performing a transaction such as access or modification on data items included in a computer database, transaction commit is usually completed according to established processing steps. If there is a catastrophic failure in a commit process and the foregoing established processing steps are interrupted, the commit process of the foregoing transaction needs to be resumed.

However, for a distributed transaction, since different distributed devices in a distributed system are involved, once the processing steps are interrupted, transaction processing statuses in the different distributed devices will be inconsistent, causing a problem that the accuracy and synchronization of distributed transaction processing cannot be ensured.

For the foregoing problem, there is no effective solutions yet.

SUMMARY

Embodiments of the present disclosure provide a method and apparatus, a storage medium, and an electronic apparatus for distributed transaction processing, to at least resolve a technical problem that the accuracy and synchronization of distributed transaction processing cannot be ensured when established steps of a distributed transaction are interrupted.

According to an aspect of the embodiments of the present disclosure, a distributed transaction processing method is provided, including: obtaining, by a distributed transaction processing device, a distributed transaction processing request, the distributed transaction processing request being used for requesting to perform a processing operation on account data in N accounts, the account data in the N accounts being located in M first object database sets, the M first object database sets being included in a target database cluster, N being an integer greater than 1, and M being an integer greater than 1; writing, by the distributed transaction processing device, a commit log corresponding to the distributed transaction processing request to a second object database set, a commit indication result being recorded in the commit log, and the commit indication result being used for indicating whether the processing operation performed on the account data in the N accounts is committed; the second object database set being included in the target database cluster; obtaining, by the distributed transaction processing device after the distributed transaction processing device resumes distributed transaction processing, the commit log from the second object database set; and performing, by the distributed transaction processing device if the commit indication result in the commit log instructs to commit the processing operation performed on the account data in the N accounts, the processing operation on the account data in the N accounts.

According to another aspect of the embodiments of the present disclosure, a distributed transaction processing apparatus is further provided, the apparatus being configured to perform the distributed transaction processing method provided in the embodiments of the present disclosure. According to still another aspect of the embodiments of the present disclosure, a storage medium is further provided, the storage medium storing a computer program, the computer program being configured to perform the foregoing distributed transaction processing method when being run.

According to still another aspect of the embodiments of the present disclosure, an electronic apparatus is further provided, the electronic apparatus including a memory, a processor, and a computer program that is stored in the memory and can be run on the processor, the processor being configured to perform the foregoing distributed transaction processing method through the computer program.

According to still another aspect of the embodiments of the present disclosure, a computer program product is further provided, the computer program product including an instruction, the instruction, when being run on a computer, causing the computer to perform the foregoing distributed transaction processing method.

In the embodiments of the present disclosure, after obtaining a distributed transaction processing request used for requesting to perform a processing operation on account data in N accounts, a distributed transaction processing device writes a commit log corresponding to the distributed transaction processing request to a second object database set, a commit indication result corresponding to the distributed transaction processing request being recorded in the commit log, and the commit indication result being used for indicating whether the processing operation performed on the account data in the N accounts is committed. The account data in the N accounts is located in M first object database sets included in a target database cluster, and the target database cluster further includes the second object database set to which the commit log is written. After resuming distributed transaction processing, the distributed transaction processing device obtains the commit log from the second object database set, and performs, if the commit indication result instructs to commit the processing operation performed on the account data in the N accounts, the processing operation on the account data in the N accounts. The commit log corresponding to the distributed transaction processing request is written to the second object database set instead of being cached locally only, so that if there is a failure during the process of distributed transaction processing, the processing operation performed on the account data in the N accounts may be resumed by using the persistent commit log written to the second object database set, and therefore transaction processing statuses in different distributed devices may be consistent, thereby ensuring the accuracy of distributed transaction processing, and further overcoming the problem of low accuracy and inconsistency of distributed transaction processing in the related art.

BRIEF DESCRIPTION OF THE DRAWINGS

Accompanying drawings described herein are used to provide further understanding about the present disclosure, and constitute one portion of this application. Exemplary embodiments of the present disclosure and their descriptions are used to explain the present disclosure, and do not constitute an inappropriate limitation on the present disclosure. In the accompanying drawings.

DESCRIPTION OF EMBODIMENTS

To make a person skilled in the art better understand solutions of the present disclosure, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between similar objects but do not necessarily indicate a specific order or sequence. It is to be understood that data used in this way is exchangeable in a proper case, so that the embodiments of the present disclosure described herein can be implemented in another order except those shown or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
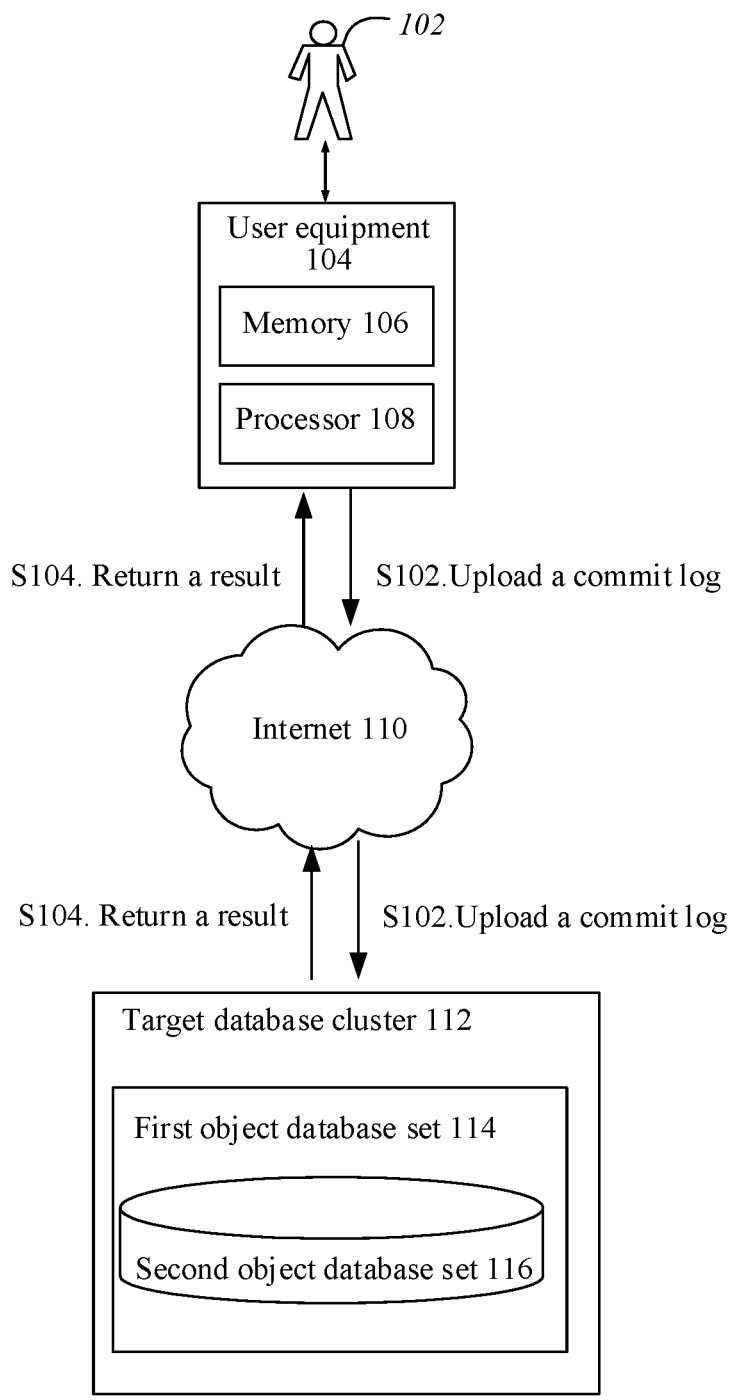
FIG. 1 is a schematic diagram of an application environment of a distributed transaction processing method according to an embodiment of the present disclosure.

According to an aspect of the embodiments of the present disclosure, a distributed transaction processing method is provided. In an optional implementation, the distributed transaction processing method provided in the embodiments of the present disclosure may be applied to, but not limited to, an environment shown in FIG. 1.

User equipment 104 is configured to complete a human-computer interaction process with a user 102. For example, the user 102 may perform a processing operation on account data of an account running in the user equipment 104 through human-computer interaction. The user equipment 104 is provided with a memory 106 and a processor 108. In this embodiment, the foregoing processing operation may include but is not limited to a processing operation performed on account data in N accounts and requested by a distributed transaction processing request, the account data in the N accounts being located in M first object database sets 114 included in a target database cluster 112. After obtaining the distributed transaction processing request, the user equipment 104 may write a commit log corresponding to the distributed transaction processing request to a second object database set 116 included in the target database cluster 112 through a network 110, as in step S102. The foregoing commit log is used for recording a commit indication result corresponding to the distributed transaction processing request, and the commit indication result is used for indicating whether the processing operation performed on the account data in the N accounts is committed. The foregoing target database cluster 112 includes the first object database sets 114 and the second object database set 116, the M first object database sets 114 are used for storing the account data in the N accounts, and the second object database set 116 is used for storing the foregoing commit log. After resuming distributed transaction processing, for example, after a faulty condition is recovered, the user equipment 104 obtains the commit log from the second object database set, and performs, if the commit indication result in the commit log instructs to commit the processing operation, the processing operation requested by the foregoing distributed transaction processing request, that is, performs the processing operation on the account data in the N accounts in the M first object database sets.

In this embodiment, after a distributed transaction processing request used for requesting to perform a processing operation on account data in N accounts is obtained, a commit log corresponding to the distributed transaction processing request is written to a second object database set, a commit indication result corresponding to the distributed transaction processing request being recorded in the commit log. The account data in the N accounts is located in M first object database sets included in a target database cluster, and the target database cluster further includes the second object database set to which the commit log is written. After distributed transaction processing is resumed, the commit log is obtained from the second object database set, and if the commit indication result in the commit log indicates commit, the processing operation is performed on the account data in the N accounts. The commit log corresponding to the distributed transaction processing request is written to the second object database set instead of being cached locally only, so that if there is a faulty condition such as a hardware or network failure during the process of the distributed transaction processing, the processing operation performed on the account data in the N accounts may be resumed by using the commit log written to the second object database set, and therefore transaction processing statuses in different distributed devices may be consistent, thereby ensuring the accuracy of distributed transaction processing, and further overcoming the problem of low accuracy of distributed transaction processing in the related art.

Optionally, the foregoing user equipment may be, but is not limited to, any hardware device that can perform distributed transaction processing, for example, a mobile phone, a tablet computer, a notebook computer, a personal computer (PC), and the like; and the foregoing network may include but is not limited to a wired network. The foregoing wired network may include but is not limited to: a wide area network, a metropolitan area network, and a local area network.

Figure 2:
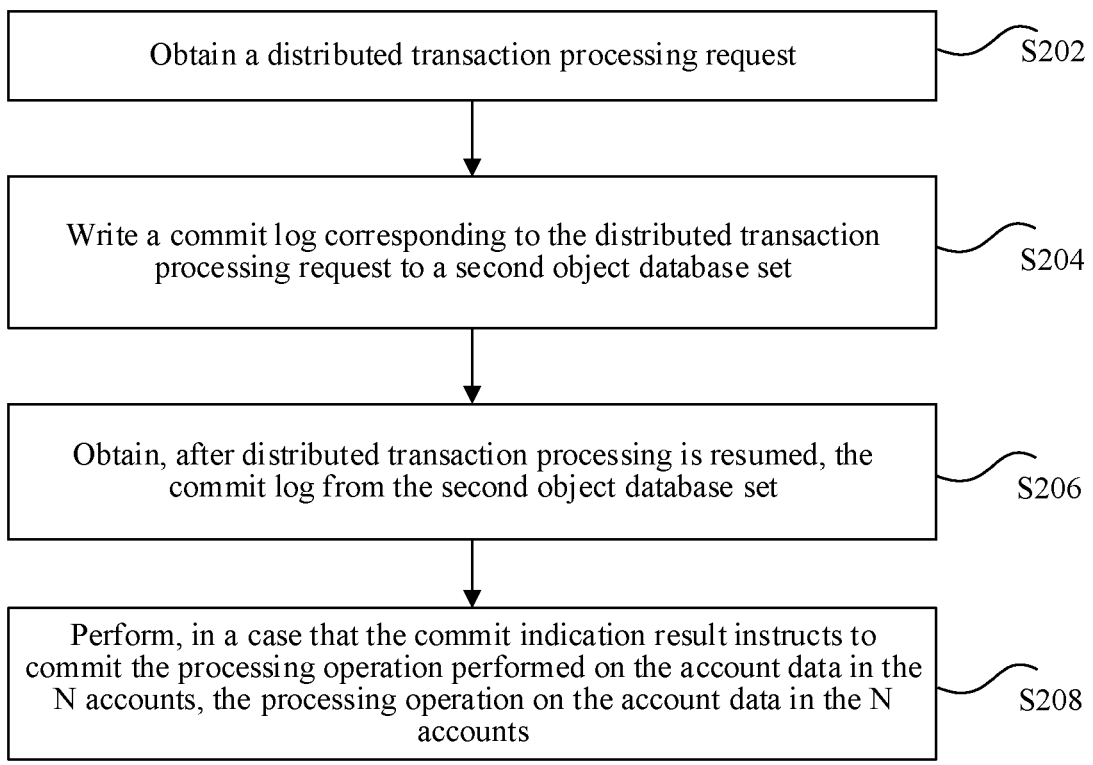
FIG. 2 is a schematic flowchart of an optional distributed transaction processing method according to an embodiment of the present disclosure.

In an optional implementation, as shown in FIG. 2, the foregoing distributed transaction processing method includes the following steps:

S202. Obtain a distributed transaction processing request.

The distributed transaction processing request is used for requesting to perform a processing operation on account data in N accounts, the account data in the N accounts is located in M first object database sets, the M first object database sets are included in a target database cluster, N is an integer greater than 1, and M is an integer greater than 1.

S204. Write a commit log corresponding to the distributed transaction processing request to a second object database set.

A commit indication result is recorded in the commit log, the commit indication result is used for indicating whether the processing operation performed on the account data in the N accounts is committed, and the second object database set is included in the target database cluster.

S206. Obtain, after distributed transaction processing is resumed, the commit log from the second object database set.

S208. Perform, if the commit indication result in the commit log instructs to commit the processing operation performed on the account data in the N accounts, the processing operation on the account data in the N accounts.

Optionally, in this embodiment, the foregoing distributed transaction processing method may be applied to, but is not limited to, a distributed transaction processing system. The distributed transaction processing system may include: a database management system that relates to distributed transaction processing such as transferring funds between a plurality of accounts (for example, transaction or payment of funds held by the accounts); and may further include: a game system that relates to distributed transaction processing such as transferring virtual resources between a plurality of accounts (for example, transfer or exchange of characters, props, and equipment held by the accounts). The foregoing description is merely an example, which is not limited in this embodiment.

In this embodiment, after a distributed transaction processing request for performing a processing operation on account data in N accounts is obtained, the account data in the N accounts being located in M first object database sets included in a target database cluster, a commit log corresponding to the distributed transaction processing request is written to a second object database set included in the target database cluster, so that the processing operation requested by the foregoing distributed transaction processing request is performed on the account data in the N accounts in the M first object database sets by using a commit indication result recorded in the commit log. In other words, the commit log corresponding to the distributed transaction processing request is written to the second object database set instead of being cached locally, so that if there is a failure during the process of distributed transaction processing, the processing operation performed on the account data in the N accounts may be resumed by using the commit log written to the second object database set, thereby ensuring the accuracy and consistency of distributed transaction processing.

Optionally, in this embodiment, a distributed transaction requested by the foregoing distributed transaction processing request is to perform a processing operation on account data in N accounts, the account data in the N accounts being located in a target database cluster. The target database cluster includes M first object database sets used for storing the account data in the N accounts and a second object database set to which the commit log corresponding to the foregoing distributed transaction processing request is written.

In this embodiment, the account quantity N of the N accounts involved in the distributed transaction processing request and the databases set quantity M of the M first object database sets may or may not be equal. In one embodiment, for example, if N is equal to M, it indicates that account data of each account is stored in one corresponding first object database set; if N is greater than M, it indicates that account data of at least two accounts is stored in the same first object database set; and if N is less than M, it indicates that account data of one account is stored in different first object database sets in a distributed manner. In another embodiment, however, there is no limitation imposed to the association of the M first object database sets and the N accounts.

Optionally, in this embodiment, the foregoing commit log corresponding to the distributed transaction processing request may record, in the form of, for example, but not limited to, a data table comprising two fields associated with the distributed transaction, that is, an identifier of the distributed transaction and a commit indication result of the distributed transaction. The foregoing commit indication result includes: commit and rollback. That is, if the commit indication result indicates "commit", the corresponding processing operation requested by the distributed transaction processing request is performed on the account data of the N accounts; and if the commit indication result indicates "rollback", the distributed transaction requested by the distributed transaction processing request is rolled back, in which case the distributed transaction processing request needs to be re-acquired, and a commit operation on the distributed transaction needs to be prepared again.

Optionally, in this embodiment, the foregoing second object database set includes a primary database (also referred to as a primary database instance) and a standby database (also referred to as a standby database instance). Databases in the second object database set may implement strong data synchronization, that is, the primary database will be directly copied to the standby database, to avoid data loss. In this embodiment, when written to the second object database set, the foregoing commit log may be written to, but is not limited to, the primary database, and then is synchronously copied to the corresponding standby database.

Optionally, in this embodiment, if there is a failure during the process of distributed transaction processing, the process of distributed transaction processing may be resumed by using the commit log written to the foregoing second object database set once the failure condition is recovered. Assuming there are i written commit logs, the first to the $i^{th}$ commit log may be sequentially read, so identifiers of distributed transactions to be processed may be obtained according to the foregoing commit logs, and the corresponding distributed transactions are performed sequentially, thereby avoiding a condition of inconsistent distributed transaction statuses.

Figure 3:
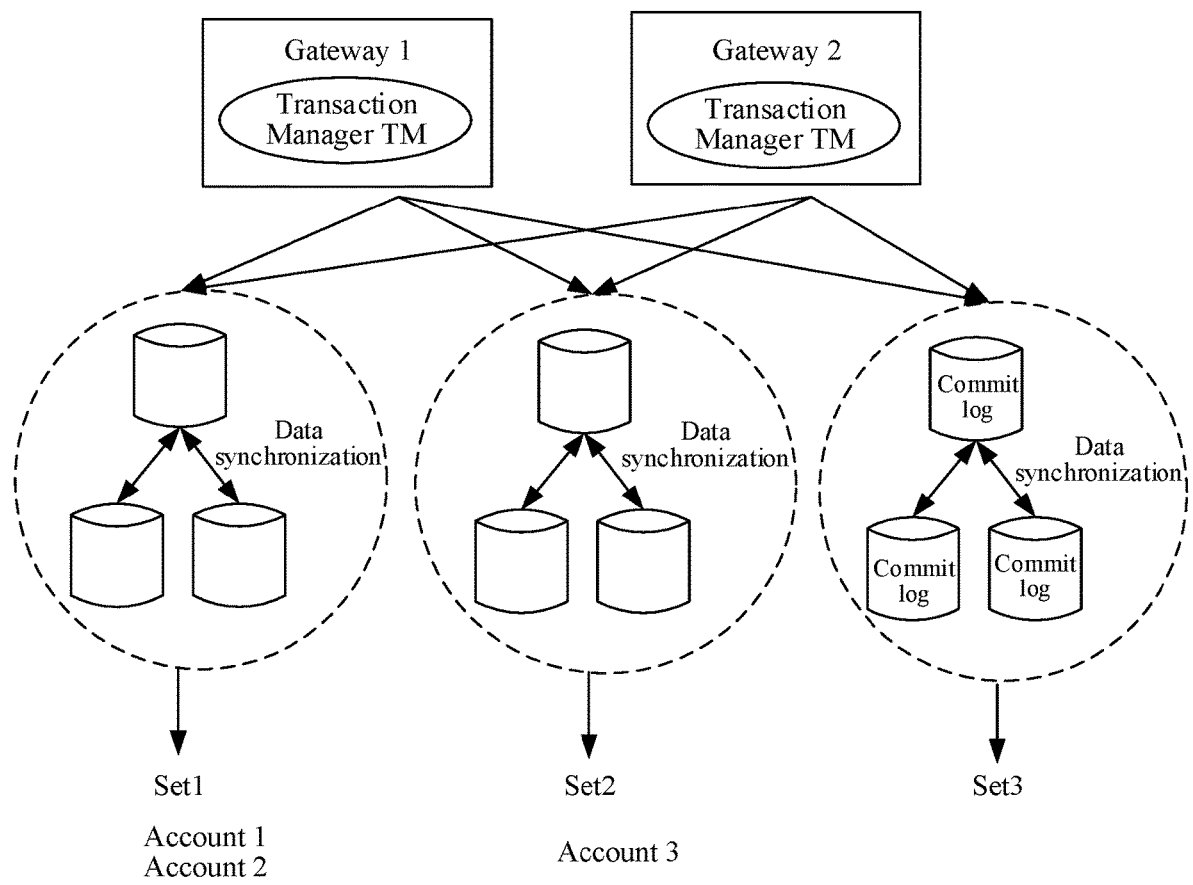
FIG. 3 is a schematic diagram of an optional distributed transaction processing method according to an embodiment of the present disclosure.

Description is made with reference to an example shown in FIG. 3. It is assumed that the distributed transaction processing method may be applied to, but is not limited to, a distributed transaction processing architecture shown in FIG. 3. The foregoing object database set may be represented by, but is not limited to, a back-end database set in this architecture, and the foregoing distributed transaction processing request may be generated in, but is not limited to, a gateway in this architecture. The foregoing gateway is configured with a transaction manager (TM) which is configured to coordinate the foregoing distributed transaction processing request, and the foregoing back-end database set is used for storing the account data associated with the distributed transaction, and is equivalent to a resource manager (RM).

In a possible implementation, as shown in FIG. 3, it is assumed that the target database cluster includes three object database sets that are set1 to set3, respectively. The obtained distributed transaction requested by the distributed transaction processing request is to perform a processing operation on account data of three accounts located in two first object database sets (for example, set1 and set2), and the three accounts are account 1 to account 3. Account data in account 1 and account 2 is stored in set1, and account data in account 3 is stored in set2.

For example, a gateway 1 serves as the distributed transaction processing device, and the gateway 1 obtains a distributed transaction processing request. For example, a distributed transaction requested by the distributed transaction processing request is that: account 1 transfers 100 dollars to account 2, and transfers 100 dollars to account 3 at the same time. A commit log corresponding to the distributed transaction processing request is obtained, and the commit log is written to a second object database set in the aforementioned target database cluster. Assuming that the selected second object database set is set3, then the foregoing commit log is written to set3. If a commit indication result in the commit log is "commit", 200 dollars is subtracted from the total asset value of account 1 in set3, and 100 dollars is added to the total asset value of each of account 2 and account 3 respectively, to complete the processing operation requested by the distributed transaction processing request.

In a possible implementation, in the case of a power failure of the gateway 1, through the method provided in this embodiment, the commit log may still be obtained from set3 without relying on the commit log cached in the transaction manager in the gateway 1, thereby avoiding a problem of low processing accuracy caused by inconsistent data statuses among distributed devices due to a failure condition.

In this embodiment provided in this application, the commit log corresponding to the distributed transaction processing request is written to the second object database set instead of being cached locally, so that if there is a failure during the process of distributed transaction processing, the processing operation performed on the account data in the N accounts in the M first object database sets may be resumed by using the commit log written to the second object database set, thereby ensuring the accuracy of distributed transaction processing.

In an optional solution, the writing a commit log corresponding to the distributed transaction processing request to a second object database set includes the following steps:

S1. Cache the commit log corresponding to the processing operation performed on the account data in the N accounts.

S2. Write the commit log to the second object database set in a distributed storage manner.

S3. Perform data synchronization on the commit log in databases included in the second object database set, the databases included in the second object database set including a primary database and a standby database.

In the related art, the foregoing commit log may be cached in the transaction manager (TM). However, in the case of a failure of the gateway where the transaction manager TM is located, the commit log corresponding to the distributed transaction processing request that is cached locally cannot be obtained, causing transaction processing in distributed devices associated with the distributed transaction to fail.

In this embodiment, the cached commit log is written to the second object database set at the back end in a distributed storage manner, and data synchronization is performed on the commit log between the primary database and the standby database included in the second object database set, to avoid data loss, so that the commit log may be directly read in the case of a failure, and the processing operation of the distributed transaction may be resumed by using the commit log.

Optionally, in this embodiment, the foregoing commit log may be recorded in the form of a data table. A data table may be implemented as a table in a database, and each commit log of a distributed transaction is recorded in a data row in the data table. Two fields, that is, an identifier of the distributed transaction and a commit indication result of the distributed transaction are recorded in the commit log. For example, the commit log may be as shown in Table 1.

TABLE 1

| Identifier (ID) of a distributed transaction | Commit indication result |
|---|---|
| 1 | Commit |
| 2 | Rollback |
| 3 | Commit |

In this embodiment, the commit logs recorded in rows shown in Table 1 may be sequentially written to the corresponding second object database set in a distributed storage manner.

Figure 4:
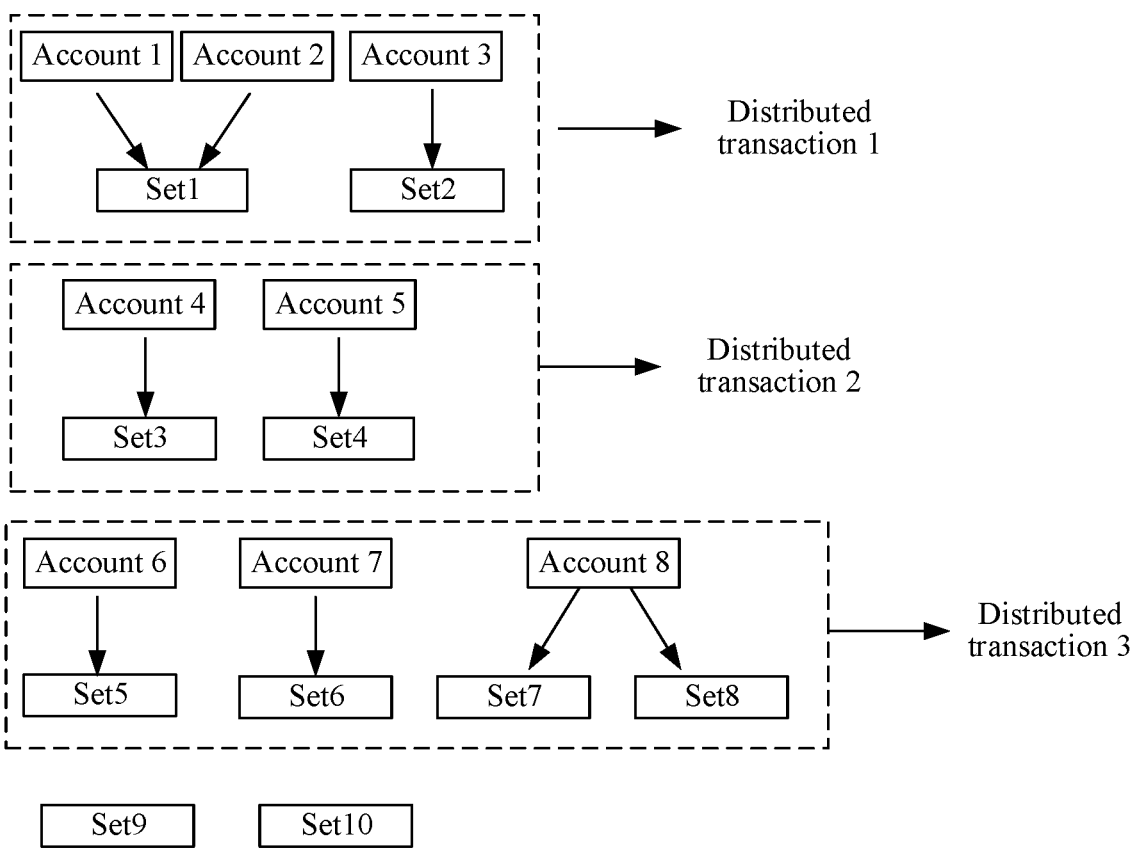
FIG. 4 is a schematic diagram of another optional distributed transaction processing method according to an embodiment of the present disclosure.

Description is made with reference to the following example. As shown in FIG. 4, it is assumed that the target database cluster includes ten object database sets that are set1 to set10. In a possible implementation, assuming a distributed transaction 1 is used to perform a processing operation on account data in account 1 to account 3, where account data in account 1 and account 2 is stored in set1, and account data in account 3 is stored in set2; further assuming a distributed transaction 2 is used to perform a processing operation on account data in account 4 and account 5, where account data in account 4 is stored in set3 and account data in account 5 is stored in set4; further assuming a distributed transaction 3 is used to perform a processing operation on account data in account 6 to account 8, where account data in account 6 is stored in set5, account data in account 7 is stored in set6, and account data in account 8 is stored in set7 and set8.

Furthermore, in a possible implementation, assuming that the second object database set is configured as the first object database set of the plurality of first object database sets associated with each distributed transaction, then the destination database sets of the commit logs shown in Table 1 are as follows: the commit log of the distributed transaction 1 will be written to set1, the commit log of the distributed transaction 2 will be written to set3, and the commit log of the distributed transaction 3 will be written to set5.

In this embodiment provided in this application, the cached commit log is written to the corresponding second object database set in a distributed storage manner, and data synchronization is performed on the commit log between the primary database and the standby database in the second object database set, thereby ensuring the accuracy of distributed transaction processing as well as avoiding data loss.

In an optional solution, the writing the commit log to the second object database set in a distributed storage manner includes the following steps:

S1. Perform a hash operation on a shared key field value recorded in the commit log, to obtain a hash value corresponding to the shared key field value.

S2. Determine the second object database set corresponding to the shared key field value in the target database cluster according to the hash value.

S3. Write the commit log to the second object database set corresponding to the shared key field value.

Optionally, in this embodiment, the foregoing shared key field value may be, but is not limited to, a value in a shard key column specified in the commit log. An exemplary share key field may be the ID field described in Table 1.

Figure 5:
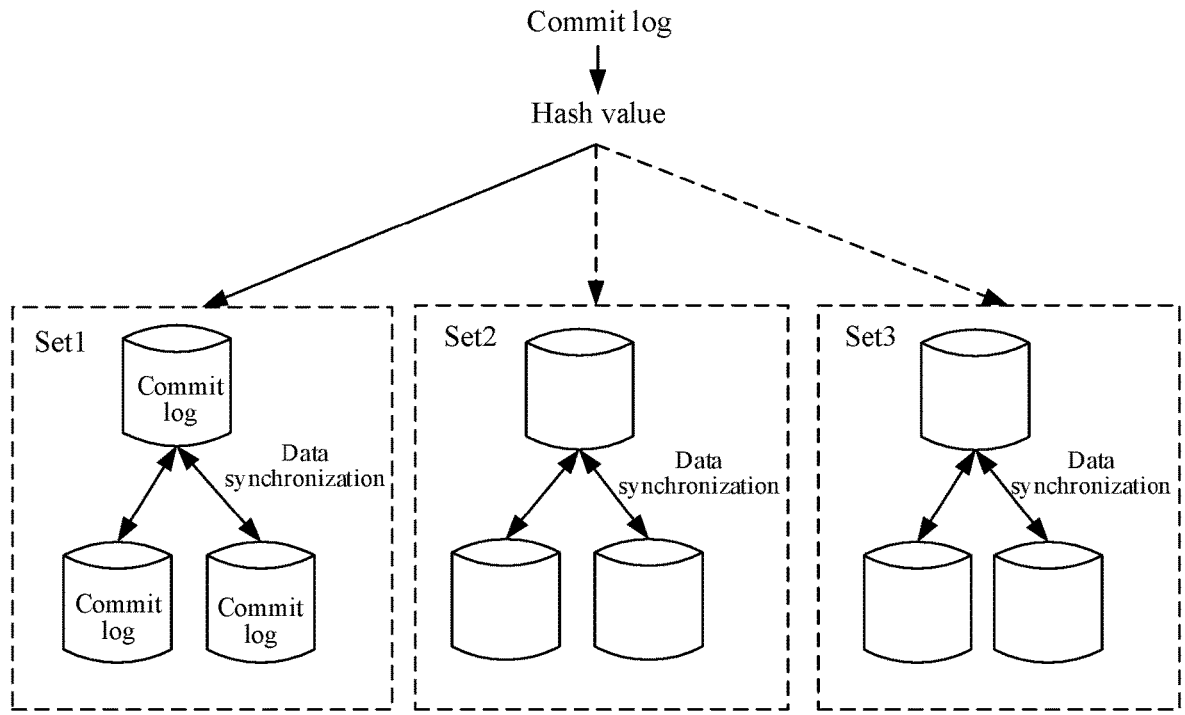
FIG. 5 is a schematic diagram of still another optional distributed transaction processing method according to an embodiment of the present disclosure.

Description is made with reference to FIG. 5. In the commit log, assuming that a column recording the identifier of the distributed transaction is the specified shard key column, the hash operation may be sequentially performed on the identifiers of the distributed transactions, to obtain a hash value. The second object database set to which the commit log is written is determined according to the hash value. For example, an identifier of the second object database set may be determined according to an end value of the hash value, or an identifier of the second object database set may be determined according to a result obtained after performing a remainder operation on a specified parameter from the hash value. Then, the foregoing commit log is written to a set indicated by the determined identifier of the second object database set. FIG. 5 shows that the set indicated by the determined identifier of the second object database set is set1. The commit log is written to set1.

The foregoing second object database set determined according to the hash value may be an object database set of the M first object database sets, or may be another object database set other than the M first object database sets.

Still using FIG. 3 as an example, the distributed transaction requested by the distributed transaction processing request is to perform a processing operation on account data of accounts located in two first object database sets (for example, set1 and set2). Assuming that the hash value obtained through the hash operation indicates that set3 is the second object database set, the commit log may be written to set3.

In this embodiment provided in this application, the commit log is written to the second object database set in a distributed storage manner by using the hash value, thereby achieving the purpose of evenly distributing the commit logs across all the second object database sets, to prevent an unbalanced condition caused by the commit logs being written to the same object database set. In one embodiment, the above commit logs distribution method further ensures load balancing among database servers and the database sets are configured to be evenly distributed on database servers.

In an optional solution, the writing the commit log to the second object database set in a distributed storage manner includes the following steps:

S1. Determine the second object database set in the M first object database sets.

S2. Write the commit log to the second object database set.

Figure 6:
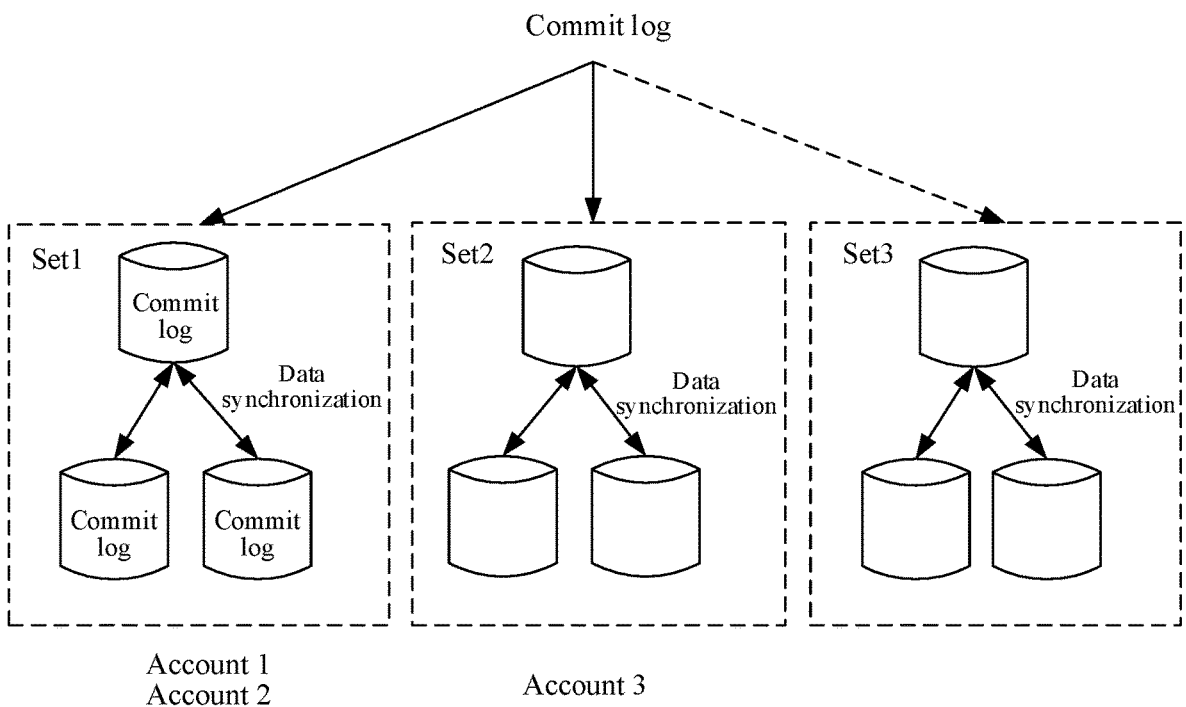
FIG. 6 is a schematic diagram of still another optional distributed transaction processing method according to an embodiment of the present disclosure.

Description is made with reference to an example shown in FIG. 6. Assuming that one first object database set of the M first object database sets is specified as the second object database set, as shown in FIG. 6, set1 in the M first object database sets is selected as the second object database set. The commit log of the distributed transaction may be written to set1, and data synchronization may be performed between a primary database and a standby database in set1. The specified first object database set may be preset, such as the first one or the last one of the M first object database sets, and there is no limitation in this application.

In this embodiment provided in this application, the commit log is written to a specified object database set of the plurality of first object database sets associated with the distributed transaction according to configuration, thereby ensuring that the commit logs are written evenly, to prevent the commit logs from being written to the same object database set.

In an optional embodiment, a plurality of commit logs may be written in batches by using a single insert statement (for example, insert), thereby improving the efficiency of writing the commit log. The method includes the following steps:

S1. Cache the commit log corresponding to the processing operation performed on the account data in the N accounts to an internal cache queue.

S2. Sequentially write, if a quantity of the commit logs cached in the internal cache queue reaches a first threshold, the commit logs cached in the internal cache queue to the corresponding second object database set by using a single insert statement.

Optionally, in this embodiment, the first threshold may be set to, but is not limited to, different values according to specific scenarios. If a quantity of the commit logs cached reaches the foregoing first threshold, the commit logs cached in the internal cache queue are sequentially written to the corresponding second object database set by using the single insert statement.

Assuming that the first threshold is five, during the process of caching the commit log, when five commit logs are cached in the internal cache queue, a background thread may assemble the five commit logs in the internal cache queue into a single insert statement, and then send the single insert statement to the second object database set. If the quantity of cached commit logs does not reach five, a wait-for-commit state is entered until the quantity of cached commit logs reaches five.

In this embodiment provided in this application, the writing process of the commit log is controlled by using the first threshold, and if the quantity of the commit logs cached in the internal cache queue reaches the first threshold, the commit logs are read from the internal cache queue, and written in batches to the second object database set, thereby simplifying the process of the writing operation of the commit log, and improving the efficiency of writing the commit log.

In an optional solution, before the writing the commit log to the second object database set in a distributed storage manner, the method further includes the following steps:

S1. Obtain an insertion time of the single insert statement.

S2. Sequentially write, if the insertion time reaches a timeout condition, invalid values to the commit log cached in the internal cache queue, the invalid values being used for preventing the commit log cached in the internal cache queue from being written to the second object database set.

When the insertion time does not reach the timeout condition, a writing operation is performed. That is, in this embodiment, if a timestamp of the insertion time in the single insert statement (for example, an insert statement) is compared with a timeout time to determine that writing has timed out, an invalid value is written to the commit log to make the insert operation fail, thereby avoiding storing the commit log that has timed out to the second object database set at the back end.

Figure 7:
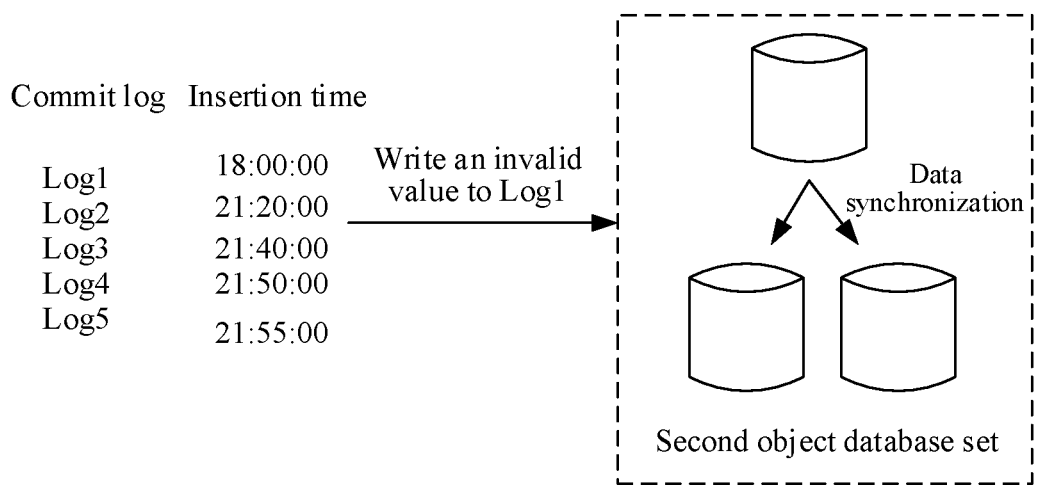
FIG. 7 is a schematic diagram of still another optional distributed transaction processing method according to an embodiment of the present disclosure.

Description is made with reference to the following example. As shown in FIG. 7, five commit logs are cached in the internal cache queue, each commit log carries an insertion time. The five commit logs are Log1 to Log5. For example, assuming that the insertion time of Log1 is 18:00:00, the insertion time of Log2 is 21:40:00, the insertion time of Log3 is 21:20:00, the insertion time of Log4 is 21:50:00, and the insertion time of Log5 is 21:55:00, Log1 has been inserted into the internal cache queue for 4 hours. In a possible implementation, it is assumed that the timeout condition is that a period of time for which the commit log is stored in the internal cache queue exceeds two hours. That is, in the foregoing example, when Log1 reaches the timeout condition, an invalid value is written to Log1. Assuming that 0 is an invalid value, the invalid value 0 may be written to Log1.

In a possible implementation, during the process of writing the foregoing five commit logs to the second object database set by using the single insert statement, if Log1 carrying the invalid value is detected in Log1 to Log5, the foregoing five commit logs will not be written to the second object database set.

In this embodiment provided in this application, by checking the insertion times of the cached commit logs, it is determined whether the commit log currently to be written reaches the timeout condition, and if the commit log reaches the timeout condition, the invalid value is written to the commit log, thereby ensuring the timeliness of the commit log, and preventing the commit log that has timed out from being written to the second object database set, so as to improve the accuracy of writing the commit log.

In an optional solution, during the process of writing the commit log to the second object database set in a distributed storage manner, the method further includes the following steps:

S1. Obtain, if a write failure is detected and the $i^{th}$ commit log cached in the internal cache queue has been successfully written to the corresponding second object database set, the first commit log to the $i^{th}$ commit log that are successfully written.

S2. Perform the processing operation according to the first commit log to the $i^{th}$ commit log.

Optionally, in this embodiment, the obtaining the first commit log to the $i^{th}$ commit log that are successfully written includes: obtaining, through an control agent device corresponding to a database included in the second object database set, the first commit log to the $i^{th}$ commit log that are successfully written, the control agent device being configured to resume the processing operation.

In this embodiment, each database in each object database set is configured with a corresponding control agent device, and the control agent device is configured to monitor the database and provide services for the database to which the control agent device belongs.

In this embodiment provided in this application, if a write failure is detected, the control agent device may obtain the commit log from the database that has been successfully written by using a monitoring result, so that the operation in the distributed transaction is resumed according to the commit log, to avoid a problem of inconsistent transaction processing statuses in the distributed devices caused by a failure.

In an optional solution, the performing, if the commit indication result instructs to commit the processing operation performed on the account data in the N accounts, the processing operation on the account data in the N accounts located in the M first object database sets includes:

1) Obtain, in a first commit mode, an automatic commit moment; and automatically perform, if the automatic commit moment is reached, the processing operation on the account data in the N accounts located in the M first object database sets.

2) Obtain, in a second commit mode, a commit instruction; and perform the processing operation on the account data in the N accounts located in the M first object database sets according to the commit instruction.

Optionally, in this embodiment, the foregoing distributed transaction processing method includes: a first commit mode (also referred to as an automatic commit mode), and a second commit mode (also referred to as an instruction commit mode). In the first commit mode, each time the operation is completed, a corresponding automatic commit instruction is automatically generated, the automatic commit instruction carrying an automatic commit moment. If the automatic commit moment is reached, a corresponding processing operation is automatically performed on the account data in the first object database set. In the second commit mode, only after a commit instruction (for example, commit) is received, a corresponding processing operation is performed on the account data in the first object database set.

Optionally, in this embodiment, an operation instruction for performing the processing operation on the account data may include, but is not limited to, at least one of the following: an insert/update/delete statement.

In this embodiment provided in this application, there are multiple modes to perform the processing operation on the account data in the accounts according to the commit log, thereby improving the flexibility of performing the processing operation.

In an optional solution, the performing, if the commit indication result instructs to commit the processing operation performed on the account data in the N accounts, the processing operation on the account data in the N accounts located in the M first object database sets includes:

S1. Perform a first processing operation on account data in the i accounts, and a second processing operation on account data in the rest of the N−i accounts, to obtain an operation result.

The operation result indicates that a total operation value of the first processing operation is equal to a total operation value of the second processing operation, the first processing operation and the second processing operation are reverse operations, and i is an integer greater than or equal to 1 and less than N.

S2. Notify application clients corresponding to the N accounts of the operation result.

For example, a financial system transfers funds between a plurality of accounts. The foregoing distributed transaction may, but is not limited to, instruct to perform a fund deduction operation on account data in some accounts and perform a fund increase operation on account data in the rest of the accounts associated with the distributed transaction. To ensure the balance of financial funds, the total operation value of the deduction operation is equal to the total operation value of the increase operation.

Optionally, in this embodiment, the performing a first processing operation on account data in the i accounts, and a second processing operation on account data in the rest of the N−i accounts includes the following steps:

1) Perform a value decreasing operation on the account data in the i accounts, and a value increasing operation on the account data in the rest of the N−i accounts. The value decreasing operation is the first processing operation, and the value increasing operation is the second processing operation.

Or,

2) Perform a value increasing operation on the account data in the i accounts, and a value decreasing operation on the account data in the rest of the N−i accounts.

The value increasing operation is the first processing operation, and the value decreasing operation is the second processing operation.

Description is made with reference to the following example. Assuming that N=3 and i=1, N−i=2. Further assuming that the distributed transaction processing request is used for requesting to perform the following operations: a total asset value of account 1 needs to be reduced by 200 dollars, and a total asset value of each of account 2 and account 3 needs to be increased by 100 dollars. After a commit log corresponding to the foregoing distributed transaction processing request is obtained, the following operations are performed on account data in account 1 to account 3: the total asset value of account 1 is reduced by 200 dollars, and a total asset value of each of account 2 and account 3 is increased by 100 dollars. The total amount of the reduction is equal to the total amount of the addition. Then, changes in total asset values of account 1 to account 3 are notified to respective application clients.

In this embodiment provided in this application, the same processing operation as the operation recorded in the commit log is performed on the account data in the accounts, thereby improving the accuracy of committing the processing operation.

For the foregoing method embodiments, each embodiment is described as a combination of a series of actions; however, a person skilled in the art is to know that, the present disclosure is not limited by the described action sequence. According to the present disclosure, some steps can be performed in another sequence or simultaneously. In addition, all the embodiments described in the specification are exemplary embodiments, and the involved actions and modules are not necessarily required by the present disclosure.

According to the foregoing descriptions of implementations, a person skilled in the art may clearly know that the method according to the foregoing embodiments may be implemented by using software and a necessary general hardware platform, or certainly may be implemented by using hardware. However, in most cases, the former is a better implementation. Based on such an understanding, the technical solutions of the present disclosure or the part that makes contributions to the related art may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

Figure 8:
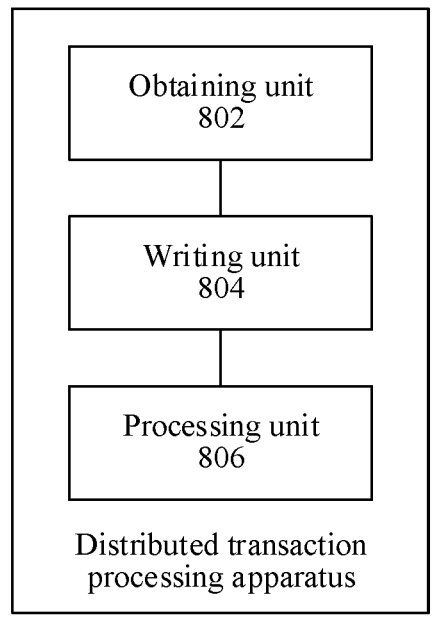
FIG. 8 is a schematic structural diagram of an optional distributed transaction processing apparatus according to an embodiment of the present disclosure.

According to another aspect of the embodiments of the present disclosure, a distributed transaction processing apparatus configured to perform the foregoing distributed transaction processing method is further provided, the apparatus being configured to perform any one of the distributed transaction processing methods provided in the foregoing embodiments. As shown in FIG. 8, the apparatus includes:

(1) an obtaining unit 802, configured to obtain a distributed transaction processing request, the distributed transaction processing request being used for requesting to perform a processing operation on account data in N accounts, the account data in the N accounts being located in M first object database sets, the M first object database sets being included in a target database cluster, N being an integer greater than 1, and M being an integer greater than 1;

(2) a writing unit 804, configured to write a commit log corresponding to the distributed transaction processing request to a second object database set, a commit indication result being recorded in the commit log, and the commit indication result being used for indicating whether the processing operation performed on the account data in the N accounts is committed; the second object database set being included in the target database cluster, (3) the obtaining unit 802 being further configured to obtain, after distributed transaction processing is resumed, the commit log from the second object database set; and (4) a processing unit 806, configured to perform, if the commit indication result in the commit log instructs to commit the processing operation performed on the account data in the N accounts, the processing operation on the account data in the N accounts.

Figure 9:
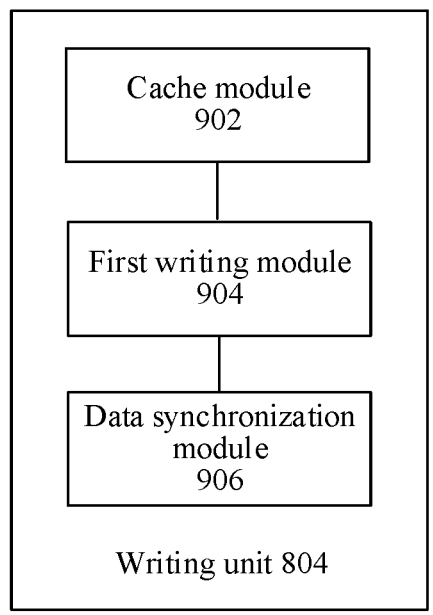
FIG. 9 is a schematic structural diagram of another optional distributed transaction processing apparatus according to an embodiment of the present disclosure.

In an optional implementation, as shown in FIG. 9, the foregoing writing unit includes:

(1) a cache module 902, configured to cache the commit log corresponding to the processing operation performed on the account data in the N accounts;

(2) a first writing module 904, configured to write the commit log to the second object database set in a distributed storage manner; and (3) a data synchronization module 906, configured to perform data synchronization on the commit log in databases included in the second object database set, the databases included in the second object database set including a primary database and a standby database.

In an optional implementation, the first writing module includes:

(1) an operating submodule, configured to perform a hash operation on a shared key field value recorded in the commit log, to obtain a hash value corresponding to the shared key field value;

(2) a first determining submodule, configured to determine the second object database set corresponding to the shared key field value in the target database cluster according to the hash value; and (3) a first writing submodule, configured to write the commit log to the second object database set corresponding to the shared key field value.

In an optional implementation, the first writing module includes:
(1) a second determining submodule, configured to determine the second object database set in the M first object database sets; and
(2) a second writing submodule, configured to write the commit log to the second object database set.

In an optional implementation,
(1) the foregoing cache module includes: a cache submodule, configured to cache the commit log corresponding to the processing operation performed on the account data in the N accounts to an internal cache queue; and
(2) the foregoing first writing module includes: a third writing submodule, configured to sequentially write, if a quantity of the commit logs cached in the internal cache queue reaches a first threshold, the commit logs cached in the internal cache queue to the corresponding second object database set by using a single insert statement.

In an optional implementation, the foregoing writing unit further includes:
(1) a first obtaining module, configured to: before writing the commit log to the second object database set in a distributed storage manner, obtain an insertion time of the single insert statement; and
(2) a second writing module, configured to sequentially write, if it is determined that the insertion time reaches a timeout condition, invalid values to the commit log cached in the internal cache queue, the invalid values being used for preventing the commit log cached in the internal cache queue from being written to the second object database set.

In an optional implementation, the foregoing writing unit further includes:
(1) a second obtaining module, configured to: during the process of writing the commit log to the second object database set in a distributed storage manner, obtain, if a write failure is detected and the $i^{th}$ commit log cached in the internal cache queue is successfully written to the corresponding second object database set, the first commit log to the $i^{th}$ commit log that are successfully written to the second object database set; and
(2) a first execution module, configured to perform the processing operation according to the first commit log to the $i^{th}$ commit log.

Optionally, in this embodiment, the obtaining the first commit log to the $i^{th}$ commit log that are successfully written includes: obtaining, through an control agent device corresponding to a database included in the second object database set, the first commit log to the $i^{th}$ commit log that are successfully written, the control agent device being configured to resume the processing operation.

In an optional implementation, the processing unit includes:
(1) a third obtaining module, configured to obtain, in a first commit mode, an automatic commit moment; and automatically perform, if the automatic commit moment is reached, the processing operation on the account data in the N accounts; and
(2) a fourth obtaining module, configured to obtain, in a second commit mode, a commit instruction; and perform the processing operation on the account data in the N accounts according to the commit instruction.

In an optional implementation, the foregoing processing unit includes:
(1) a second execution module, configured to perform a first processing operation on account data in the i accounts, and a second processing operation on account data in the rest of the N−i accounts, to obtain an operation result, the operation result indicating that a total operation value of the first processing operation is equal to a total operation value of the second processing operation, the first processing operation and the second processing operation being reverse operations, and i being an integer greater than or equal to 1 and less than N; and
(2) a notification module, configured to notify application clients corresponding to the N accounts of the operation result.

Optionally, in this embodiment, the performing a first processing operation on account data in the i accounts, and a second processing operation on account data in the rest of the N−i accounts includes the following steps:
1) Perform a value decreasing operation on the account data in the i accounts, and a value increasing operation on the account data in the rest of the N−i accounts, the value decreasing operation being the first processing operation, and the value increasing operation being the second processing operation;
or,
2) Perform a value increasing operation on the account data in the i accounts, and a value decreasing operation on the account data in the rest of the N−i accounts, the value increasing operation being the first processing operation, and the value decreasing operation being the second processing operation.

Figure 10:
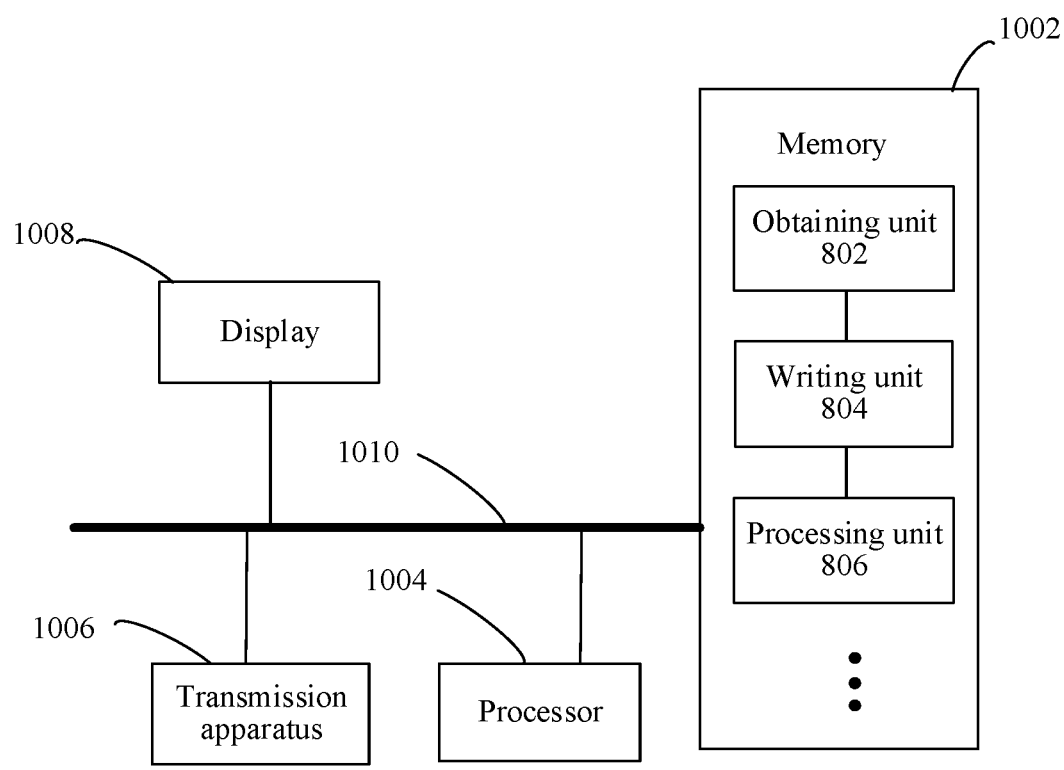
FIG. 10 is a schematic structural diagram of an optional electronic apparatus according to an embodiment of the present disclosure.

According to still another aspect of the embodiments of the present disclosure, an electronic apparatus configured to implement the foregoing distributed transaction processing method is further provided. As shown in FIG. 10, the electronic apparatus includes a memory and a processor, the memory storing a computer program, and the processor being configured to perform steps in any one of the foregoing method embodiments through the computer program.

Optionally, in this embodiment, the electronic apparatus may be located in at least one of a plurality of network devices in a computer network.

Optionally, in this embodiment, the foregoing processor may be configured to perform the following steps through a computer program:
S1. Obtain a distributed transaction processing request, the distributed transaction processing request being used for requesting to perform a processing operation on account data in N accounts, the account data in the N accounts being located in M first object database sets, the M first object database sets being included in a target database cluster, N being an integer greater than 1, and M being an integer greater than 1.
S2. Write a commit log corresponding to the distributed transaction processing request to a second object database set, a commit indication result being recorded in the commit log, and the commit indication result being used for indicating whether the processing operation performed on the account data in the N accounts is committed; the second object database set being included in the target database cluster.
S3. Obtain, after distributed transaction processing is resumed, the commit log from the second object database set.

S4. Perform, if the commit indication result in the commit log instructs to commit the processing operation performed on the account data in the N accounts, the processing operation on the account data in the N accounts.

A person of ordinary skill in the art may understand that, the structure shown in FIG. 10 is only illustrative. The electronic apparatus may be a terminal device such as a smartphone (for example, an Android mobile phone or an iOS mobile phone), a tablet computer, a laptop computer, a mobile Internet device (MID), or a portable Android device (PAD). FIG. 10 does not constitute a limitation on a structure of the foregoing electronic apparatus. For example, the electronic apparatus may further include more or fewer components (for example, a network interface) than those shown in FIG. 10, or have a configuration different from that shown in FIG. 10.

The memory 1002 may be configured to store a software program and module, such as a program instruction/module corresponding to the distributed transaction processing method and apparatus in the embodiments of the present disclosure. The processor 1004 runs the software program and module stored in the memory 1002, to perform various functional applications and data processing, thereby implementing the foregoing distributed transaction processing method. The memory 1002 may include a high-speed random memory, and a non-volatile memory such as one or more magnetic storage devices, a flash, or another non-volatile solid-state memory. In some examples, the memory 1002 may include memories remotely disposed relative to the processor 1004 in a possible implementation, and the remote memories may be connected to a terminal through a network. An example of the network includes, but is not limited to, the Internet, an intranet, a local area network, a mobile communications network and a combination thereof. Specifically, the memory 1002 may be configured to, but is not limited to, store content such as a commit log. In an example, as shown in FIG. 10, the memory 1002 may include, but is not limited to, the obtaining unit 802, the writing unit 804, and the processing unit 806 in the foregoing distributed transaction processing apparatus. In addition, the memory may further include, but is not limited to, other module units in the foregoing distributed transaction processing apparatus, and details are not described in this example again.

The transmission apparatus 1006 is configured to receive or send data by using a network. A specific example of the network may include a wired network and a wireless network. In an example, the transmission apparatus 1006 includes a network interface controller (NIC). The NIC may be connected to another network device and a router by using a network cable, so as to communicate with the Internet or the local area network. In an embodiment, the transmission apparatus 1006 is a radio frequency (RF) module that is configured to communicate with the Internet in a wireless manner.

In addition, the foregoing electronic apparatus further includes: a display 1008, configured to display content such as a commit log; and a connection bus 1010, configured to connect various module components in the foregoing electronic apparatus.

According to still another aspect of the embodiments of the present disclosure, a storage medium is further provided. The storage medium stores a computer program, the computer program being configured to perform steps in any one of the foregoing method embodiments when being run.

Optionally, in this embodiment, the storage medium may be configured to store a computer program for performing the following steps:

S1. Obtain a distributed transaction processing request, the distributed transaction processing request being used for requesting to perform a processing operation on account data in N accounts, the account data in the N accounts being located in M first object database sets, the M first object database sets being included in a target database cluster, N being an integer greater than 1, and M being an integer greater than 1.

S2. Write a commit log corresponding to the distributed transaction processing request to a second object database set, a commit indication result being recorded in the commit log, and the commit indication result being used for indicating whether the processing operation performed on the account data in the N accounts is committed; the second object database set being included in the target database cluster.

S3. Obtain, after distributed transaction processing is resumed, the commit log from the second object database set.

S4. Perform, if the commit indication result in the commit log instructs to commit the processing operation performed on the account data in the N accounts, the processing operation on the account data in the N accounts.

Optionally, in this embodiment, the storage medium may be configured to store a computer program for performing the following steps:

S1. Cache the commit log corresponding to the processing operation performed on the account data in the N accounts.

S2. Write the commit log to the second object database set in a distributed storage manner.

S3. Perform data synchronization on the commit log in databases included in the second object database set, the databases included in the second object database set including a primary database and a standby database.

Optionally, in this embodiment, the storage medium may be configured to store a computer program for performing the following steps:

S1. Perform a hash operation on a shared key field value recorded in the commit log, to obtain a hash value corresponding to the shared key field value.

S2. Determine the second object database set corresponding to the shared key field value in the target database cluster according to the hash value.

S3. Write the commit log to the second object database set corresponding to the shared key field value.

Optionally, in this embodiment, the storage medium may be configured to store a computer program for performing the following steps:

S1. Determine the second object database set in the M first object database sets.

S2. Write the commit log to the second object database set.

Optionally, in this embodiment, the storage medium may be configured to store a computer program for performing the following steps:

S1. Cache the commit log corresponding to the processing operation performed on the account data in the N accounts to an internal cache queue.

S2. Sequentially write, if a quantity of the commit logs cached in the internal cache queue reaches a first threshold, the commit logs cached in the internal cache queue to the corresponding second object database set by using a single insert statement.

Optionally, in this embodiment, the storage medium may be configured to store a computer program for performing the following steps:
S1. Obtain an insertion time of the single insert statement.
S2. Sequentially write, if it is determined that the insertion time reaches a timeout condition, invalid values to the commit log cached in the internal cache queue, the invalid values being used for preventing the commit log cached in the internal cache queue from being written to the second object database set.

Optionally, in this embodiment, the storage medium may be configured to store a computer program for performing the following steps:
S1. Obtain, if a write failure is detected and the $i^{th}$ commit log cached in the internal cache queue has been successfully written to the corresponding second object database set, the first commit log to the $i^{th}$ commit log that are successfully written to the second object database set.
S2. Perform the processing operation according to the first commit log to the $i^{th}$ commit log.

Optionally, in this embodiment, the storage medium may be configured to store a computer program for performing the following steps:
S1. Obtain, through an control agent device corresponding to a database included in the second object database set, the first commit log to the $i^{th}$ commit log that are successfully written to the second object database set, the control agent device being configured to resume the processing operation.

Optionally, in this embodiment, the storage medium may be configured to store a computer program for performing the following steps:
S1. Obtain, in a first commit mode, an automatic commit moment; and automatically perform, if the automatic commit moment is reached, the processing operation on the account data in the N accounts.
S2. Obtain, in a second commit mode, a commit instruction; and perform the processing operation on the account data in the N accounts according to the commit instruction.

Optionally, in this embodiment, the storage medium may be configured to store a computer program for performing the following steps:
S1. Perform a first processing operation on account data in the i accounts, and a second processing operation on account data in the rest of the N−i accounts, to obtain an operation result, the operation result indicating that a total operation value of the first processing operation is equal to a total operation value of the second processing operation, the first processing operation and the second processing operation being reverse operations, and i being an integer greater than or equal to 1 and less than N.
S2. Notify application clients corresponding to the N accounts of the operation result.

Optionally, in this embodiment, the storage medium may be configured to store a computer program for performing the following steps:
S1. Perform a value decreasing operation on the account data in the i accounts, and a value increasing operation on the account data in the rest of the N−i accounts, the value decreasing operation being the first processing operation, and the value increasing operation being the second processing operation;

or,
S2. Perform a value increasing operation on the account data in the i accounts, and a value decreasing operation on the account data in the rest of the N−i accounts, the value increasing operation being the first processing operation, and the value decreasing operation being the second processing operation.

Optionally, in this embodiment, a person of ordinary skill in the art may understand that all or part of the steps of the methods in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, an optical disc, and the like.

The sequence numbers of the embodiments of the present disclosure are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the present disclosure.

In the foregoing embodiments of the present disclosure, the descriptions of the embodiments have respective focuses. For the part that is not detailed in an embodiment, refer to the relevant description of other embodiments.

In the several embodiments provided in this application, it is understood that the disclosed client may be implemented in other manners. For example, the described apparatus embodiment is merely an example. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The foregoing descriptions are merely exemplary implementations of the present disclosure. A person of ordinary skill in the art may make several improvements or polishing without departing from the principle of the present disclosure, and the improvements or polishing shall fall within the protection scope of the present disclosure.

What is claimed is:

1. A distributed transaction processing method, comprising:
obtaining, by a distributed transaction processing device, a distributed transaction processing request, the distributed transaction processing request being used for requesting to perform a processing operation on account data in N accounts, the account data in the N accounts being located in M first object database sets in a target database cluster, N being an integer greater than 1, and M being an integer greater than 1;
writing, by the distributed transaction processing device, a commit log corresponding to the distributed transaction processing request to a second object database set in the target database cluster, the commit log comprising a commit indication result being recorded and used for indicating whether the processing operation performed on the account data in the N accounts is committed, and the commit indication result comprising at least a commit indication and a rollback indication, wherein the distributed transaction processing device is remotely connected to the target database cluster via a network;
obtaining, by the distributed transaction processing device after the distributed transaction processing device resumes distributed transaction processing, the commit log from the second object database set; and
performing, by the distributed transaction processing device when the commit indication result in the commit log instructs to commit the processing operation on the account data in the N accounts, the processing operation on the account data in the N accounts.

2. The method according to claim 1, wherein writing, by the distributed transaction processing device, the commit log corresponding to the distributed transaction processing request to the second object database set comprises:
caching, by the distributed transaction processing device, the commit log corresponding to the processing operation performed on the account data in the N accounts;
writing, by the distributed transaction processing device, the commit log to the second object database set in a distributed storage manner; and
performing, by the distributed transaction processing device, data synchronization on the commit log in databases comprised in the second object database set, the databases comprised in the second object database set comprising a primary database and a standby database.

3. The method according to claim 2, wherein writing, by the distributed transaction processing device, the commit log to the second object database set in a distributed storage manner comprises:
performing, by the distributed transaction processing device, a hash operation on a shared key field value recorded in the commit log, to obtain a hash value corresponding to the shared key field value;
determining, by the distributed transaction processing device, the second object database set corresponding to the shared key field value in the target database cluster according to the hash value; and
writing, by the distributed transaction processing device, the commit log to the second object database set corresponding to the shared key field value.

4. The method according to claim 2, wherein writing, by the distributed transaction processing device, the commit log to the second object database set in a distributed storage manner comprises:
determining, by the distributed transaction processing device, the second object database set in the M first object database sets; and
writing, by the distributed transaction processing device, the commit log to the second object database set.

5. The method according to claim 2, wherein:
caching, by the distributed transaction processing device, the commit log corresponding to the processing operation performed on the account data in the N accounts comprises:
caching, by the distributed transaction processing device, the commit log corresponding to the processing operation performed on the account data in the N accounts to an internal cache queue; and
writing, by the distributed transaction processing device, the commit log to the second object database set in a distributed storage manner comprises:
sequentially writing, by the distributed transaction processing device if a quantity of the commit logs cached in the internal cache queue reaches a first threshold, the commit logs cached in the internal cache queue to the corresponding second object database set by using a single insert statement.

6. The method according to claim 5, wherein before writing, by the distributed transaction processing device, the commit log to the second object database set in a distributed storage manner, the method further comprises:
obtaining, by the distributed transaction processing device, an insertion time of the single insert statement; and
sequentially writing, by the distributed transaction processing device, if it is determined that the insertion time reaches a timeout condition, invalid values to the commit log cached in the internal cache queue, the invalid values being used for preventing the commit log cached in the internal cache queue from being written to the second object database set.

7. The method according to claim 5, wherein writing, by the distributed transaction processing device, the commit log to the second object database set in a distributed storage manner, the method further comprises:
obtaining, by the distributed transaction processing device, if a write failure is detected and the $i^{th}$ commit log cached in the internal cache queue is successfully written to the corresponding second object database set, the first commit log to the $i^{th}$ commit log that are successfully written to the second object database set, i being a positive integer; and
performing, by the distributed transaction processing device, the processing operation according to the first commit log to the $i^{th}$ commit log.

8. The method according to claim 7, wherein obtaining, by the distributed transaction processing device, the first commit log to the $i^{th}$ commit log that are successfully written to the second object database set comprises:
obtaining, by the distributed transaction processing device through a control agent device corresponding to a database comprised in the second object database set, the first commit log to the $i^{th}$ commit log that are successfully written to the second object database set.

9. The method according to claim 1, wherein performing, by the distributed transaction processing device if the commit indication result in the commit log instructs to commit the processing operation comprises:
obtaining, by the distributed transaction processing device in a first commit mode, an automatic commit moment; and automatically performing, by the distributed transaction processing device if the automatic commit moment is reached, the processing operation on the account data in the N accounts; and
obtaining, by the distributed transaction processing device in a second commit mode, a commit instruction; and performing, by the distributed transaction processing device, the processing operation on the account data in the N accounts according to the commit instruction.

10. The method according to claim 1, wherein performing, by the distributed transaction processing device if the commit indication result in the commit log instructs to commit the processing operation comprises:
performing, by the distributed transaction processing device, a first processing operation on account data in i accounts, and a second processing operation on account data in rest of the N−i accounts, to obtain an operation result, the operation result indicating that a total operation value of the first processing operation is equal to a total operation value of the second processing operation, the first processing operation and the second processing operation being reverse operations, and i being an integer greater than or equal to 1 and less than N; and
notifying, by the distributed transaction processing device, the operation result to application clients corresponding to the N accounts.

11. The method according to claim 10, wherein performing, by the distributed transaction processing device, the first processing operation on account data in the i accounts, and the second processing operation on account data in the rest of the N−i accounts comprises at least one of:
performing, by the distributed transaction processing device, a value decreasing operation on the account data in the i accounts, and a value increasing operation on the account data in the rest of the N−i accounts, the value decreasing operation being the first processing operation, and the value increasing operation being the second processing operation, or performing, by the distributed transaction processing device, a value increasing operation on the account data in the i accounts, and a value decreasing operation on the account data in the rest of the N−i accounts, the value increasing operation being the first processing operation, and the value decreasing operation being the second processing operation.

12. An apparatus for distributed transaction processing, comprising a memory for storing computer readable instructions and a processor in communication with the memory, wherein the processor is configured to execute the computer readable instructions to cause the apparatus to:
obtain, by a distributed transaction processing device, a distributed transaction processing request, the distributed transaction processing request being used for requesting to perform a processing operation on account data in N accounts, the account data in the N accounts being located in M first object database sets in a target database cluster, N being an integer greater than 1, and M being an integer greater than 1;
write, by the distributed transaction processing device, a commit log corresponding to the distributed transaction processing request to a second object database set in the target database cluster, the commit log comprising a commit indication result being recorded and used for indicating whether the processing operation performed on the account data in the N accounts is committed, and the commit indication result comprising at least a commit indication and a rollback indication, wherein the distributed transaction processing device is remotely connected to the target database cluster via a network;
obtain, by the distributed transaction processing device after the distributed transaction processing device resumes distributed transaction processing, the commit log from the second object database set; and
perform, by the distributed transaction processing device when the commit indication result in the commit log instructs to commit the processing operation on the account data in the N accounts, the processing operation on the account data in the N accounts.

13. The apparatus according to claim 12, wherein the processor, when executing the computer readable instructions to cause the apparatus to write the commit log corresponding to the distributed transaction processing request to the second database set, is configured to cause the apparatus to:
cache the commit log corresponding to the processing operation performed on the account data in the N accounts;
write the commit log to the second object database set in a distributed storage manner; and
perform data synchronization on the commit log in databases comprised in the second object database set, the databases comprised in the second object database set comprising a primary database and a standby database.

14. The apparatus according to claim 13, wherein the processor, when executing the computer readable instructions to cause the apparatus to write the commit log to the second object database set in a distributed storage manner, is configured to cause the apparatus to:
perform a hash operation on a shared key field value recorded in the commit log, to obtain a hash value corresponding to the shared key field value;
determine the second object database set corresponding to the shared key field value in the target database cluster according to the hash value; and
write the commit log to the second object database set corresponding to the shared key field value.

15. The apparatus according to claim 13, wherein the processor, when executing the computer readable instructions to cause the apparatus to write the commit log to the second object database set in a distributed storage manner, is configured to cause the apparatus to:
determine the second object database set in the M first object database sets; and
write the commit log to the second object database set.

16. The apparatus according to claim 13, wherein:
the processor, when executing the computer readable instructions to cause the apparatus to cache the commit log corresponding to the processing operation performed on the account data in the N accounts, is configured to cause the apparatus to:
cache the commit log corresponding to the processing operation performed on the account data in the N accounts to an internal cache queue; and
the processor, when executing the computer readable instructions to cause the apparatus to write the commit log to the second object database set in a distributed storage manner, is configured to cause the apparatus to:

sequentially write, if a quantity of the commit logs cached in the internal cache queue reaches a first threshold, the commit logs cached in the internal cache queue to the corresponding second object database set by using a single insert statement.

17. The apparatus according to claim 16, wherein the processor, before executing the computer readable instructions to cause the apparatus to write the commit log to the second object database set in a distributed storage manner, is configured to cause the apparatus to:
    obtain an insertion time of the single insert statement; and
    sequentially write, if it is determined that the insertion time reaches a timeout condition, invalid values to the commit log cached in the internal cache queue, the invalid values being used for preventing the commit log cached in the internal cache queue from being written to the second object database set.

18. The apparatus according to claim 16, wherein the processor, when executing the computer readable instructions to cause the apparatus to write the commit log to the second object database set in a distributed storage manner, is further configured to cause the apparatus to:
    obtain, if a write failure is detected and the $i^{th}$ commit log cached in the internal cache queue is successfully written to the corresponding second object database set, the first commit log to the $i^{th}$ commit log that are successfully written to the second object database set, i being a positive integer; and
    perform the processing operation according to the first commit log to the $i^{th}$ commit log.

19. The apparatus according to claim 18, wherein the processor, when executing the computer readable instructions to cause the apparatus to obtain the first commit log to the $i^{th}$ commit log that are successfully written to the second object database set, is configured to cause the apparatus to:
    obtain through a control agent device corresponding to a database comprised in the second object database set, the first commit log to the $i^{th}$ commit log that are successfully written to the second object database set.

20. A non-transitory storage medium for storing computer readable instructions, the computer readable instructions, when executed by a processor, causing the processor to:
    obtain a distributed transaction processing request, the distributed transaction processing request being used for requesting to perform a processing operation on account data in N accounts, the account data in the N accounts being located in M first object database sets in a target database cluster, N being an integer greater than 1, and M being an integer greater than 1;
    write a commit log corresponding to the distributed transaction processing request to a second object database set in the target database cluster, the commit log comprising a commit indication result being recorded and used for indicating whether the processing operation performed on the account data in the N accounts is committed, and the commit indication result comprising at least a commit indication and a rollback indication, wherein the distributed transaction processing device is remotely connected to the target database cluster via a network;
    obtain, after the distributed transaction processing device resumes distributed transaction processing, the commit log from the second object database set; and
    perform, when the commit indication result in the commit log instructs to commit the processing operation on the account data in the N accounts, the processing operation on the account data in the N accounts.

* * * * *